US009533742B2

(12) United States Patent
Deven et al.

(10) Patent No.: US 9,533,742 B2
(45) Date of Patent: Jan. 3, 2017

(54) MARINE NAVIGATION LIGHT APPARATUSES AND METHODS OF MAKING THE SAME

(71) Applicants: Randal A. Deven, Arnold, MO (US); Justin E. Schweiss, Arnold, MO (US)

(72) Inventors: Randal A. Deven, Arnold, MO (US); Justin E. Schweiss, Arnold, MO (US)

( * ) Notice: Subject to any disclaimer, the term of this patent is extended or adjusted under 35 U.S.C. 154(b) by 13 days.

(21) Appl. No.: 14/640,622

(22) Filed: Mar. 6, 2015

(65) Prior Publication Data

US 2015/0274267 A1 Oct. 1, 2015

Related U.S. Application Data

(60) Provisional application No. 61/973,449, filed on Apr. 1, 2014.

(51) Int. Cl.

| | |
|---|---|
| ***B60Q 1/00*** | (2006.01) |
| ***F21V 1/00*** | (2006.01) |
| ***B63B 45/04*** | (2006.01) |
| ***F21V 31/00*** | (2006.01) |

(52) U.S. Cl.

CPC ............. *B63B 45/04* (2013.01); *F21V 31/005* (2013.01); *Y10T 29/49162* (2015.01)

(58) Field of Classification Search

CPC ....... F21V 31/005; F21V 31/04; F21V 21/116; F21V 23/002; B63B 45/04; B63B 2201/04; B63B 2724/00

See application file for complete search history.

(56) References Cited

U.S. PATENT DOCUMENTS

| | | | | |
|---|---|---|---|---|
| 5,416,670 | A | 5/1995 | Authier | |
| 5,486,987 | A | 1/1996 | Fritz | |
| 5,704,704 | A * | 1/1998 | Reichard | B63B 45/04 362/267 |
| 5,711,591 | A * | 1/1998 | Jordan | B60Q 1/2657 362/229 |
| 6,155,195 | A | 12/2000 | Nirenberg | |
| 6,164,803 | A | 12/2000 | Reniger et al. | |
| 6,848,815 | B1 | 2/2005 | Born | |
| 7,018,081 | B2 | 3/2006 | Hopkins | |
| 7,422,351 | B2 | 9/2008 | Villani | |
| 7,758,219 | B2 | 7/2010 | Burke | |
| 8,172,437 | B2 | 5/2012 | Burke | |
| 2002/0189521 | A1* | 12/2002 | Henry | B63B 45/04 114/242 |
| 2004/0240209 | A1* | 12/2004 | Snow, Jr. | B63B 45/04 362/487 |

(Continued)

*Primary Examiner* — Peggy Neils
*Assistant Examiner* — Alexander Garlen
(74) *Attorney, Agent, or Firm* — PatentFile, LLC; Bradley C. Fach; Steven R. Kick

(57) ABSTRACT

A maritime navigation light apparatus comprising a pole element, a base, and a light assembly with one or more light emitting elements is presented. The pole element may comprise a hollow core and may be permanently or temporarily coupled to the base and/or to the light assembly. The light emitting elements may be housed on a circuit board and encased in an impact resistant encasement and electrically connected to electrical wires. The electrical wires may be inserted through the hollow core or the pole element and may also comprise electrical plug members which may terminate on the exterior or interior of the apparatus.

15 Claims, 10 Drawing Sheets

(56) References Cited

U.S. PATENT DOCUMENTS

| | | | | |
|---|---|---|---|---|
| 2005/0237730 | A1* | 10/2005 | Barnes | B60Q 1/32 362/34 |
| 2008/0247161 | A1* | 10/2008 | Hulsey | B63B 45/04 362/227 |
| 2012/0039081 | A1* | 2/2012 | Burke | B63B 45/04 362/477 |

* cited by examiner

MARINE NAVIGATION LIGHT APPARATUSES AND METHODS OF MAKING THE SAME

CROSS REFERENCE TO RELATED APPLICATIONS

This application claims priority to and the benefit of the filing date of U.S. Provisional Application No. 61/973,449, filed on Apr. 1, 2014, entitled "MARINE NAVIGATION AND ANCHOR POLE LIGHT APPARATUSES AND METHODS OF MAKING THE SAME", which is hereby incorporated by reference in its entirety.

FIELD OF THE INVENTION

The present invention relates to the field of mechanical electrical interfaces in general. More specifically, the invention relates to electrical lighting interfaces for boats and other types of watercraft.

BACKGROUND

The use of lights in boats is a necessary requirement when operating a watercraft at night or in low visibility conditions. While the boat is operating on the water, the lights convey the orientation and position of the boat in the water to other watercraft. These lights are commonly known as "running lights" and typically comprise a red light and green light positioned along the bow of the boat and a white light in a raised position along the stern of the boat.

The running light positioned along the stern of the boat is a sometimes referred to as a "pole light". A pole light consists of a pole or rod with the light located on the upper end of the pole. The lower end of the pole light is then mounted onto the hull so that the light extends upwards away from the hull.

Due to the raised nature of the pole light positioned on the hull of the stern, this pole light is subject to frequent impacts and insults which often result in damage or breakage of the pole light. While broken pole lights are time consuming and costly to fix, failure to maintain an operable pole light while operating a boat at night can result in dangerous conditions and even fines by waterway authorities.

One type of pole light is a detachable from the hull of the boat. A permanent base is mounted to the hull of the boat and the pole and light configuration is inserted into the permanent base. This type of pole light allows for removal of the pole light when not in use to prevent damage. However, upon reattaching the pole light to the hull, the pole light is once again subject to frequent impacts and insults which often result in damage or breakage of the pole light.

Another type of pole light comprises a flexible pole that is configured to bend or flex to resist impacts and insults which often result in damage or breakage of the pole light. Due to the flexible nature of the pole, these flexible pole lights suffer from reduced strength and are even more prone to damage as they lose or gain flexibility due to exposure to the elements over time.

Therefore, a need exists for novel marine navigation light apparatuses and methods. There is a further need for a navigation light that is able to withstand frequent impacts and insults without resulting in damage or breakage of the navigation light. Finally, there exists a need for a navigation light that is able to be easily and conveniently to set up and use on a plurality of boats and watercraft while meeting or exceeding common rules a regulations regarding pole lights.

BRIEF SUMMARY OF THE INVENTION

A marine navigation light apparatus is provided. In some embodiments, the apparatus may comprise: a base; a pole element coupled to the base, the pole element having a proximal end and a distal end; and a light assembly positioned or coupled to the distal end of the pole element.

According to one aspect, a method of manufacturing a maritime navigation light apparatus is provided. In some embodiments, the method may comprise coupling the pole element to the base with heat bonding, chemical bonding, adhesives, fasteners, or any other suitable joining method. Next, the electrical wiring may be inserted into and through hollow core of the pole element. The electrical wiring may then be coupled to the light assembly comprising a circuit board housing a plurality of light emitting elements such as light emitting diodes. In some embodiments, the light assembly may comprise a circuit board which may be flexible and configured to bend or flex while housing a plurality of light emitting elements and while maintaining electrical communication between the light emitting elements and the electrical wiring. Finally, the light assembly may be coupled to the distal end of the pole element. In some embodiments, the light assembly may be coupled to the pole element with tubular shaped heat activated shrink wrap which may be placed over the circuit board and then activated to form an impact resistant encasement on the light assembly and on the distal end of the pole element.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New marine navigation light apparatuses and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
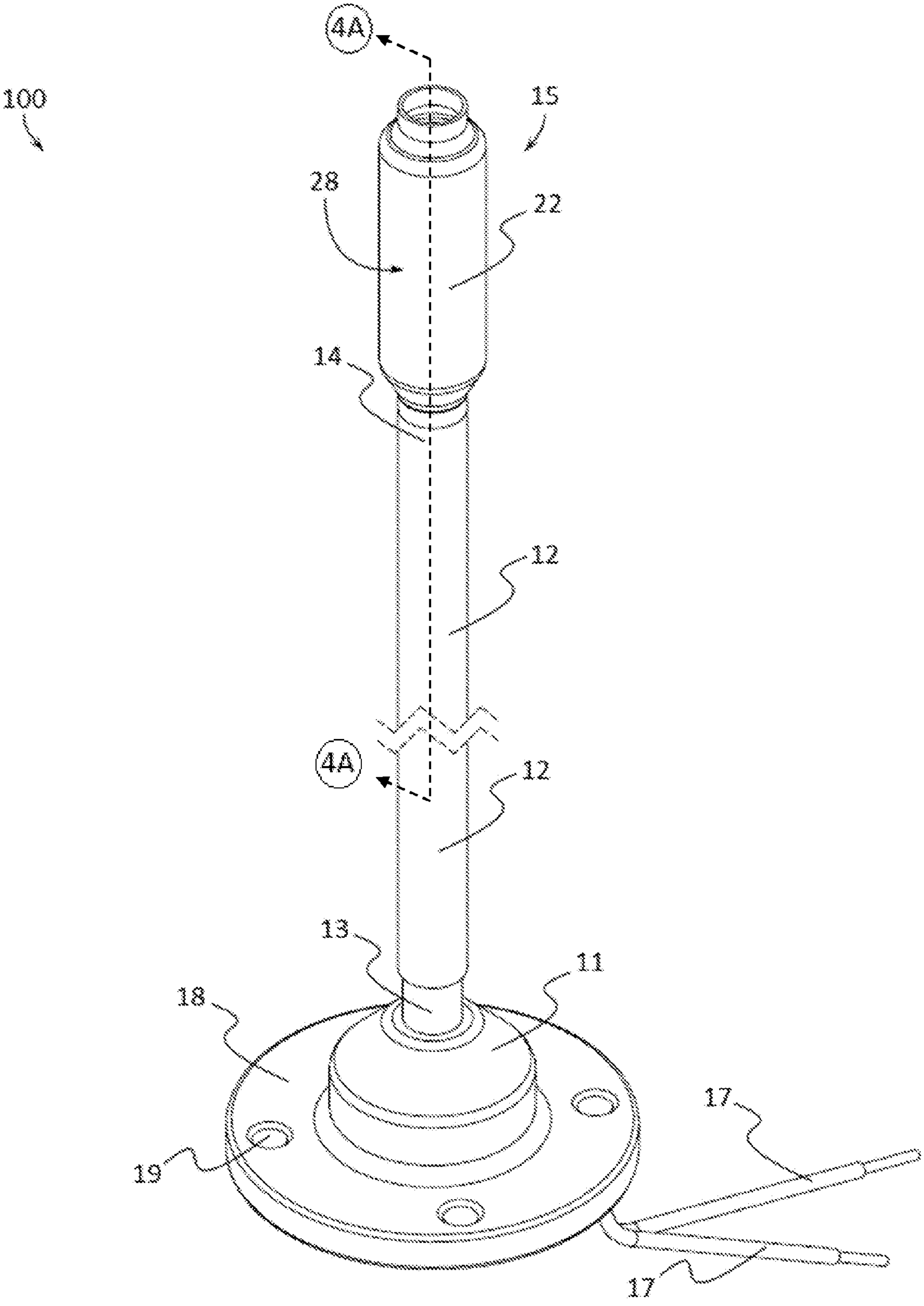
FIG. 1 depicts a perspective view of an example of a maritime navigation light apparatus according to various embodiments described herein.
Figure 2:
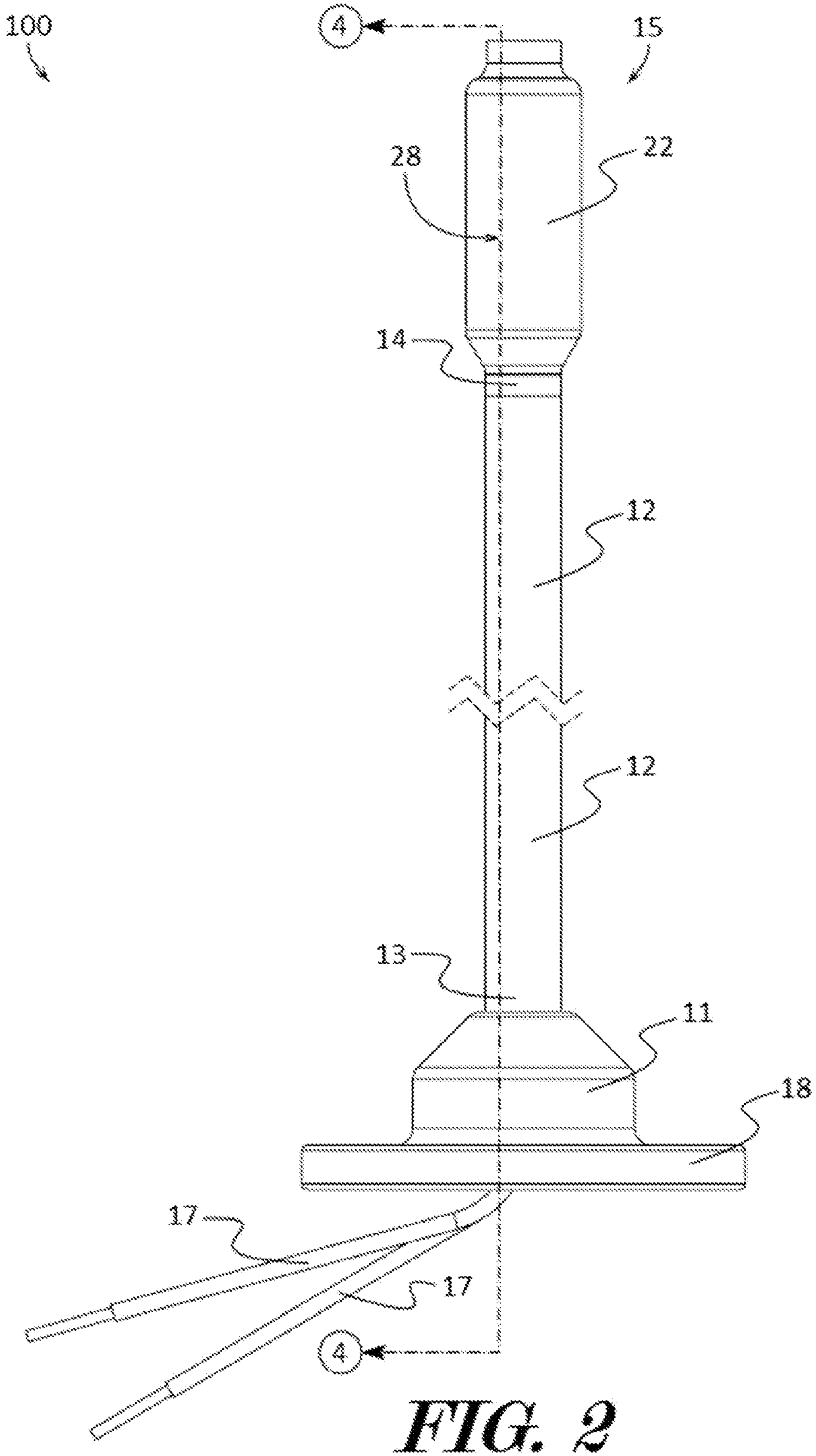
FIG. 2 illustrates an elevation view of an example of a maritime navigation light apparatus according to various embodiments described herein.
Figure 3:
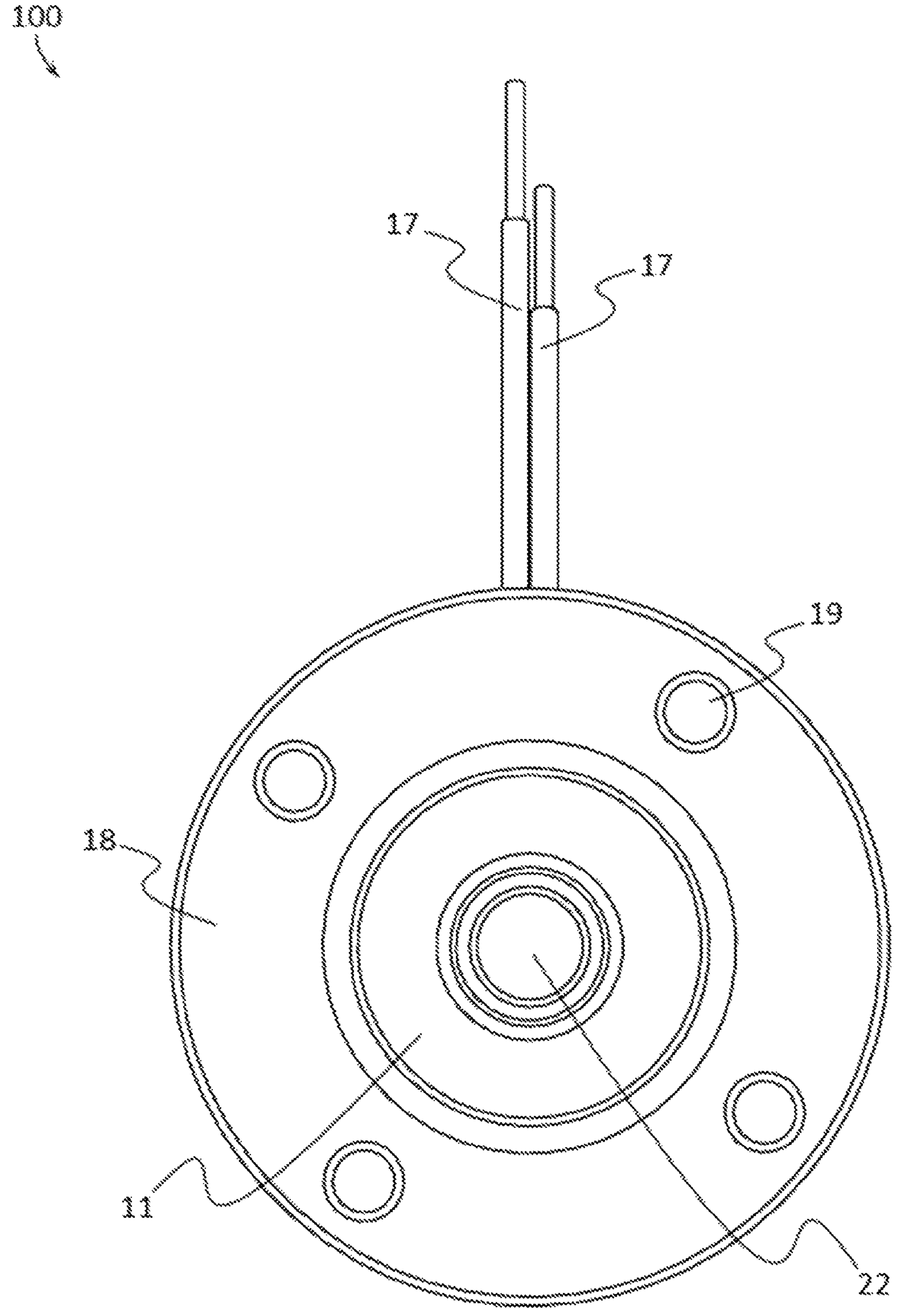
FIG. 3 shows a plan view of the top of an example of a maritime navigation light apparatus according to various embodiments described herein.

The present invention will now be described by example and through referencing the appended figures representing preferred and alternative embodiments. FIGS. 1-3 illustrate a perspective view, elevation view, and top view, respectively of an example of a marine navigation light apparatus ("the apparatus") 100 according to various embodiments. In this example, the apparatus 100 comprises a base 11, a pole element 12 coupled to the base 11, the pole element 12 having a proximal end 13 and a distal end 14, and a light assembly 15 positioned or coupled to the distal end 14 of the pole element 12.

In some embodiments, the base 11 may be coupled to the proximal end 13 of the pole element 12 and the light assembly may be coupled to the distal end 14 of the pole element. The base 11 and/or light assembly 15 may be coupled to the pole element 12 by being connected, removably coupled, or integrally formed or molded with the apparatus 100. In some embodiments, the base 11, light assembly 15, and/or the pole element 12 may be made from injected molded nylon, glass filled nylon, other plastics, metal alloys, carbon fiber, or other similar materials, and they may be coupled or connected together with heat bonding, chemical bonding, adhesives, clasp type fasteners, clip type fasteners, rivet type fasteners, threaded type fasteners, other types of fasteners, or any other suitable joining method. In other embodiments, the base 11, light assembly 15, and/or the pole element 12 may be removably coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary or removable connection method as one reasonably skilled in the art could envision to serve the same function. In further embodiments, the base 11, light assembly 15, the pole element 12, and/or any other element described herein may be coupled by being one of connected to and integrally formed such as being molded together or formed as a single structure with another element of an apparatus 100.

As perhaps best shown in FIG. 1 and also in FIGS. 2 and 3, in some embodiments, the base 11, pole element 12, and/or light assembly 15 may comprise a generally elongated annular or cylindrical shape. It should be understood to one of ordinary skill in the art that the base 11, pole element 12, and/or light assembly 15 may be configured in a plurality of sizes and shapes including elongated rectangular prism shaped, elongated cuboid shaped, elongated hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes in size and shape may be made without departing from the spirit or scope of the invention.

In some embodiments, the base 11 may comprise an optional mounting bracket 18 which may be connected, removably coupled, or integrally formed or molded to the base 11. Additionally, the base 11 and/or the mounting bracket 18 may comprise one or more fastener apertures 19 configured to accept and secure various types of fasteners including anchor bolt, batten, brass fastener, buckle, cable tie, captive fastener, clamp (or cramp), hose clamp, clasps, lobster clasp, cleko, clips, circlip, hairpin clip, paper clip, terry clip, clutch, drawing pin (thumbtack), flange, grommet, hook-and-eye closure, hook and loop fastener, latch, nail, pegs, clothespin, tent peg, PEM nut, pins, bowtie cotter pin, circle cotter, clevis fastener, cotter, dowel, linchpin, R-clip, split pin, spring pin, tapered pin, retaining rings, circlip, e-ring, rivet, rubber band (or bands of other materials), screw anchor, snap fastener, staple, stitches, strap, threaded fastener, captive threaded fasteners, nut, screw, threaded insert, threaded rod, tie, toggle bolt, treasury tag, twist tie, wedge anchor, or any other suitable type of fastener which may be used to secure the base 11 and/or the mounting bracket 18 and therefore the apparatus 100 to a watercraft. In other embodiments, the base 11 and/or the mounting bracket 18 may be configured to secure to a watercraft by a threaded screw type connection method, a push-to-lock type connection method, a turn-to-lock type connection method, slide-to-lock or any other suitable temporary connection method as one reasonably skilled in the art could envision to serve the same function.

Figure 4:
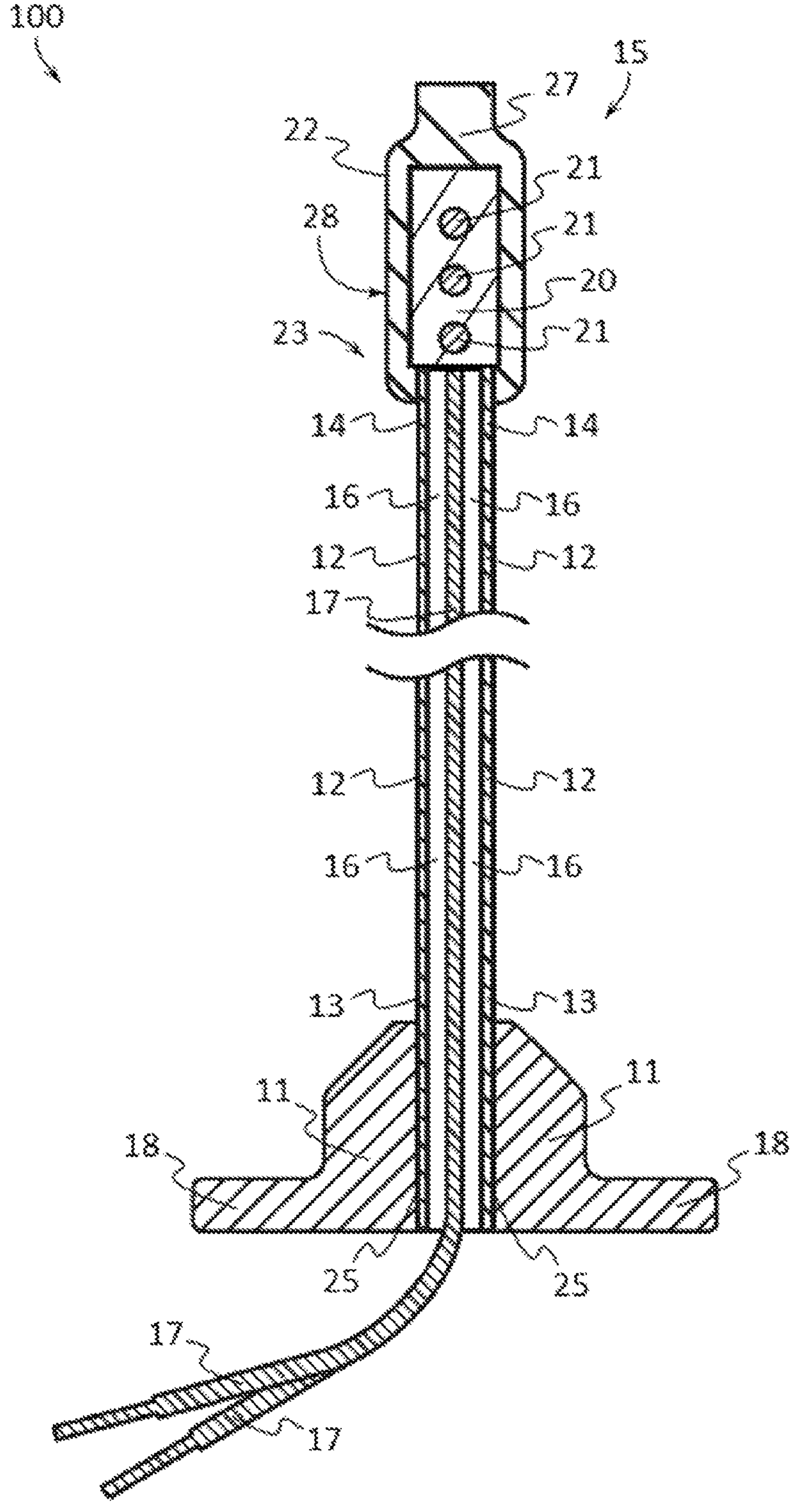
FIG. 4 depicts a sectional, through line 4-4 shown in FIG. 2, elevation view of an example of a maritime navigation light apparatus according to various embodiments described herein.
Figure 4A:
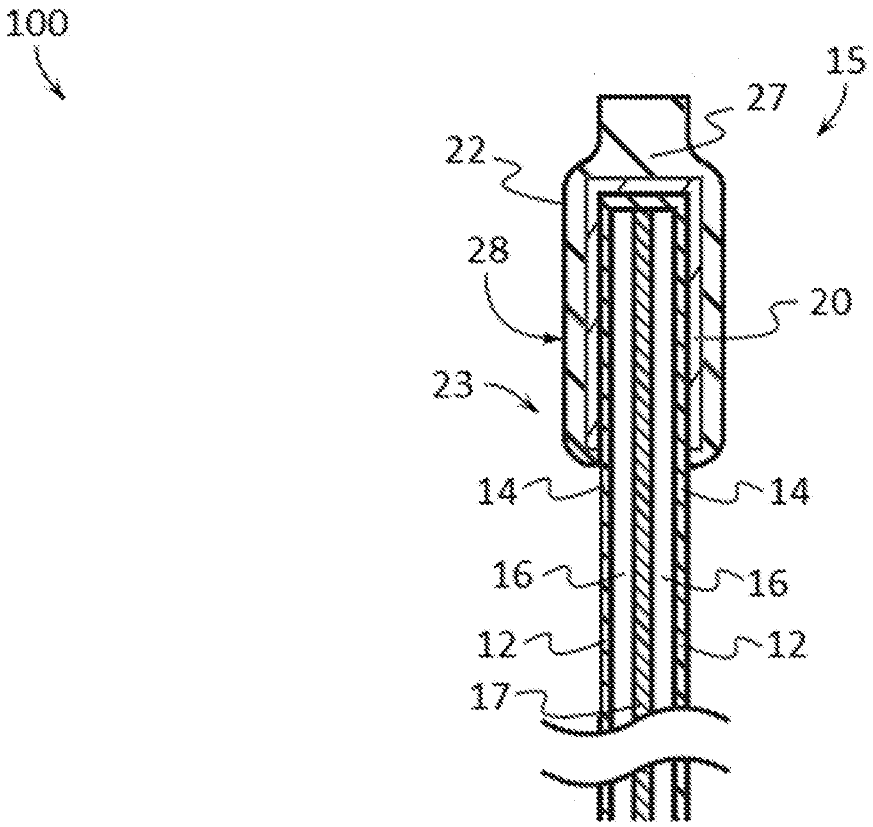
FIG. 4A depicts a sectional, through line 4A-4A shown in FIG. 1, elevation view of an example of a maritime navigation light apparatus according to various embodiments described herein.
Figure 5:
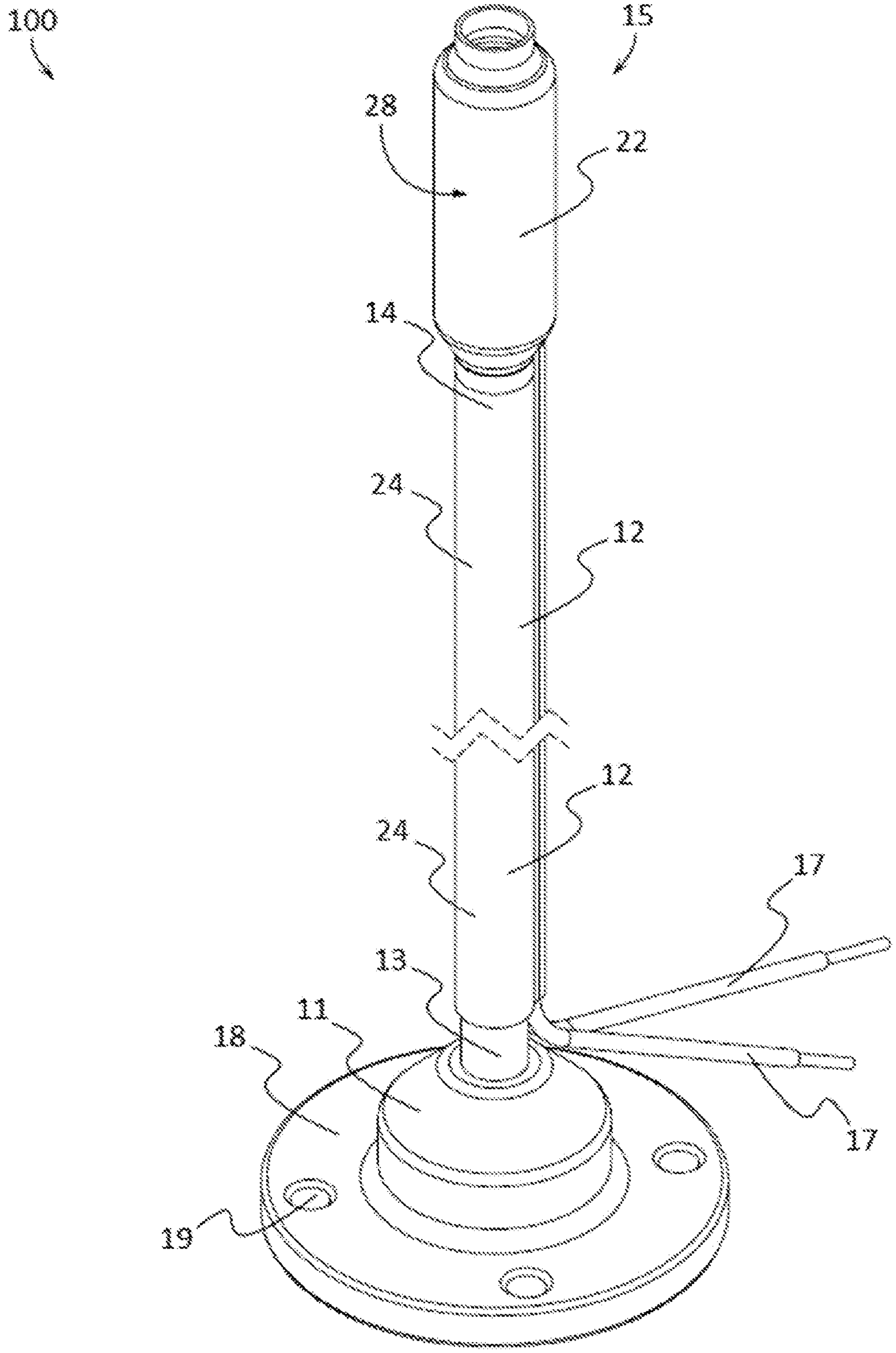
FIG. 5 illustrates a perspective view of an alternative example of a maritime navigation light apparatus according to various embodiments described herein.

Turning now to FIG. 4 a sectional, through line 4-4 shown in FIG. 2, elevation view of an example of a maritime navigation light apparatus 100 according to various embodiments described herein is depicted. In some embodiments, the pole element 12 may be shaped generally as a tube and may comprise a hollow core 16 which may extend the length of the pole element 12 connecting the proximal end 13 to the distal end 14 and may be configured to accept electrical wiring 17. The pole element 12 may be made from metal alloys, ceramics, carbon fiber, hard plastics, fiber reinforced plastics, fiberglass, hard resins, or any other rigid material or combination of rigid materials with similar hardness and durability properties. In addition to these hard materials, portions of the pole element 12 may also comprise other materials including flexible plastics, flexible rubber, or any other flexible material. In further embodiments, the apparatus 100 may comprise electrical wiring 17 which may be disposed in the hollow core 16. The electrical wiring 17 may comprise one or more wires or other electrical connections which are configured to supply the light assembly 15 with electricity. The wires of the electrical wiring 17 may be made from materials common in the art of watercraft electrical connections such as iron, copper, aluminum, brass, bronze, or any other eclectically conductive material, metal, or metal alloy.

In some embodiments, the light assembly 15 may comprise one or more such as a plurality of light emitting elements 21 which may be in electrical communication with the electrical wiring 17. In further embodiments, the light assembly 15 may comprise a circuit board 20 housing one or more light emitting elements 21 which may be configured to provide electrical communication between the electrical wiring 17 and one or more light emitting elements 21. In some embodiments, a circuit board 20 may be flexible and configured to bend or flex while housing a plurality of light emitting elements 21 and maintaining electrical communication between the light emitting elements 21 and the electrical wiring 17. A circuit board 20 may comprise a printed circuit board (PCB) which mechanically supports and electrically connects electronic components such as light emitting elements 21 using conductive tracks, pads and other features etched from copper sheets laminated onto a non-conductive substrate. PCBs can be flexible or rigid, single sided (one copper layer), double sided (two copper layers) or multi-layer. Conductors on different layers may be connected with plated-through holes called vias. In some embodiments, a circuit board 20 may only comprise copper connections and no embedded components and may be called a printed wiring board (PWB) or etched wiring board. In other embodiments, a circuit board 20 may comprise a printed circuit assembly (PCA), printed circuit board assembly or PCB assembly (PCBA), a circuit card assembly (CCA), or a backplane assembly, or any other suitable electrical connection and communication method including standard wiring and the like.

The light assembly 15 is configured to emit light including light that conforms to common watercraft rules and regulations utilizing one or more light emitting elements 21. In some embodiments, a light emitting element 21 may comprise light emitting diodes (LEDs) configured to illuminate with various colors and intensities of light allowing a plurality of color patterns and intensity patterns to be generated. In other embodiments, a light emitting element 21 may comprise other light emitting elements such as an incandescent light bulb, a halogen light bulb, fluorescent light bulb, a high-intensity discharge light bulb, laser light emitter, electroluminescent light sources, neon light sources, or any other suitable light source, light producing structure, or bulb.

In some embodiments, the light assembly 15 may comprise one or more light emitting elements 21 and be coated by an impact resistant encasement 22 which may be configured to surround or encase the light emitting elements 21 and/or an optional circuit board 20. An impact resistant encasement 22 may be made from flexible transparent or translucent materials such as flexible plastics such as vinyl, silicone, including shrink wraps made of polyolefin, PVC, Polyethylene, Polypropylene, and the like in a variety of thicknesses, clarifies, strengths and shrink ratios or any other suitable material that is impact resistant and transparent or translucent. Generally, impact resistance decreases with an increase in the modulus of elasticity, such that stiffer materials will have less impact resistance, while resilient materials will have better impact resistance. A coat of impact resistant encasement 22 comprising vinyl, plastisol, nylon, polyolefin, polyethylene, or any other suitable material may be applied over the circuit board 20 and a portion of the pole element 12, such as the distal end 14, by dip molding. For example, the circuit board 20 and a portion of the pole element 12 may be heated and then dipped into liquid plastisol. During dipping, heat in the circuit board 20 and the pole element 12 transfers to the plastisol and gels the surrounding material. The hotter the circuit board 20 and the pole element 12 and the longer the dip, the thicker the gelled coating. Once the circuit board 20 and the pole element 12 are removed from the liquid plastisol, the gelled plastisol on the circuit board 20 and the pole element 12 may be post heated (or “cured”) and the plastisol fuses.

In some embodiments, the impact resistant encasement 22 may be formed or coated onto the exterior of the light assembly 28 as a light assembly shrink wrap 27 made of heat activated shrink wrap. In further embodiments, once the light emitting elements 21 and/or an optional circuit board 20 are in electrical communication with the electrical wiring 17, an impact resistant encasement 22 made of heat activated shrink wrap may be placed over the light emitting elements 21 and/or an optional circuit board 20 of the light assembly 15 and formed over the light emitting elements 21, an optional circuit board 20, and the distal end 14 of the pole element 12 thereby securing and these elements together as a coating.

In still further embodiments, an impact resistant encasement 22 may further comprise an adhesive such as epoxy resins, also known as polyepoxides, which may be heat cured, electromagnetic radiation cured, and the like which may be configured to further seal the light assembly 15 from water and air which may be encountered in a marine environment. A coat of impact resistant encasement 22 comprising Bisphenol A epoxy resin, Bisphenol F epoxy resin, Novolac epoxy resin, Aliphatic epoxy resin, Glycidylamine epoxy resin, epoxy powder coatings, or any other suitable epoxy material may be applied over the circuit board 20 and a portion of the pole element 12, such as the distal end 14, by dip molding. For example, the circuit board 20 and a portion of the pole element 12 may be dipped, bushed, flow coated, roll coated, knife coated, or spayed with liquid epoxy. The applied epoxy coating may then be cured over the circuit board 20 and portions of the pole element 12 forming of impact resistant encasement 22.

In still embodiments, the light assembly 15 may be integrally formed with the pole element 12 by coupling light emitting elements 21 and an optional circuit board 20 to the pole element 12, shrinking shrink wrap over the light emitting elements 21, optional circuit board 20, and the pole element 12, and then applying an adhesive such as epoxy to portions of the light emitting elements 21, optional circuit board 20, and the pole element 12 not sealed by the shrink wrap.

In even further embodiments, the light emitting elements 21 and/or an optional circuit board 20 may be fused to the pole element 12 to form an integrated or sealed structure by an impact resistant encasement 22 made of tubular shrink wrap forms a coating which may be placed over the light emitting elements, an optional circuit board 20, and a portion of the pole element 12 such as the distal end 14 and then shrunk or activated over the elements. In further embodiments, an epoxy such as a heat cured epoxy applied to the open end of the tubular shrink wrap furthest from the pole element 12 which may then be cured. In still further embodiments, the apparatus 100 may comprise a laminated structure 23 which may include a circuit board 20 with light emitting elements 21 in electrical communication with the electrical wiring 17 which may be laminated to portions of the pole element 12 such as the distal end 14 by shrunk tubular shrink wrap and then sealed with epoxy that may be applied to portions of the pole element 12, light emitting elements 21, and/or circuit board 20 which may not be sealed by the shrink wrap. The laminated structure 23 may be fused or sealed by the shrink wrap and or epoxy which are configured to seal the light assembly 15 from water and air which may be encountered in a marine environment.

Figure 8:
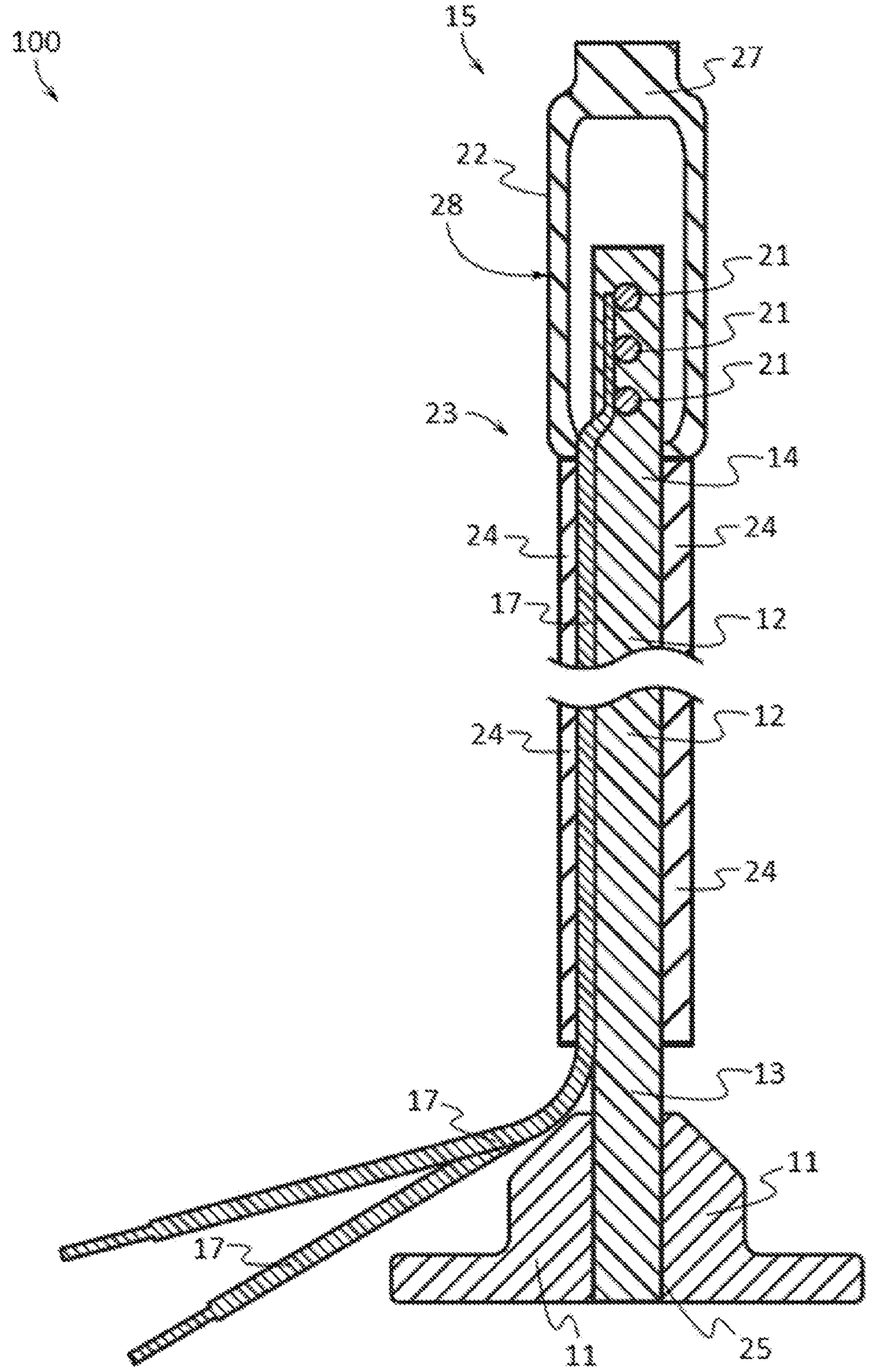
FIG. 8 illustrates a sectional, through line 8-8 shown in FIG. 6, elevation view of an alternative example of a maritime navigation light apparatus according to various embodiments described herein.

Referring now to FIGS. 5-8, an alternative example of a maritime navigation light apparatus 100 according to various embodiments described herein is illustrated. In this example, the apparatus 100 comprises a base 11, a pole element 12 coupled to the base 11, the pole element 12 having a proximal end 13 and a distal end 14, and a light assembly 15 positioned or coupled to the distal end 14 of the pole element 12. As shown in FIG. 8, in alternative embodiments, the pole element 12 may be generally solid with electrical wiring 17 coupled to the surface of the pole element 12. In some embodiments, the electrical wiring 17 may be coupled to the pole element 12 with a pole shrink wrap 24 formed of a heat activated shrink wrap which may be placed over portions of the electrical wiring 17 and pole element 12 and then shrunk or activated thereby securing the electrical wiring 17 to the pole element 12. In other embodiments, an adhesive which may include but not limited to natural adhesives including natural resins and bioadhesives or synthetic adhesives such as epoxy, polyurethane, cyanoacrylate and acrylic polymer based adhesives may be placed over portions of the electrical wiring 17 and pole element 12 and then cured thereby securing the electrical wiring 17 to the pole element 12. While the term adhesive is used it should be understood that this term may at times be substituted for glues, cements, mucilages, or pastes.

In further embodiments, the light emitting elements 21 and/or an optional circuit board 20 may be mounted within the pole element 12 or optionally attached to or coupled with the pole element 12. In embodiments where the light emitting elements 21 are attached to or coupled with the pole element 12, the pole element 12 may be solid or substantially solid with the light emitting elements 21 attached to or coupled around the exterior of the distal end 14 of the pole element 12. An impact resistant encasement 22 may be formed by coating the light emitting elements 21 on a circuit board 20 and pole element 12 with clear plastics such as transparent or translucent polyvinyl chloride (PVC), vinyl, polyolefin, polyethylene, other flexible transparent plastics, silicone, epoxy, rubber, non-flexible plastics, shrink wrap, or any other suitable material that is impact resistant and transparent or translucent. In embodiments wherein the pole element 12 is substantially solid with little or no hollow space disposed within its interior, the electrical wiring 17 may extend from the light assembly 15 and pass over the exterior of the pole element 12 as shown in FIG. 8. An impact resistant encasement 22 may be formed onto the exterior of the light assembly 28 as a light assembly shrink wrap 27 made of heat activated shrink wrap that is used to surround the electrical wiring 17 and/or the pole element 12 thereby securing them to each other and preventing the electrical wiring 17 from snagging or catching onto various objects associated with watercraft.

In some embodiments, a light assembly 15 may be removably coupled to the pole element 12. An impact resistant encasement 22 may be formed onto the light assembly 15 which may include one or more such as a plurality of light emitting elements 21 housed on a circuit board 20. The light assembly 15 may be removably coupled to the pole element 12 by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary or removable connection method as one reasonably skilled in the art could envision to serve the same function. Similarly, the electrical wiring 17 may also be removably coupled to the light emitting elements 21 housed on a circuit board 20 so that when the light assembly 15 is removably coupled to the pole element 12 the electrical wiring 17 may be in electrical communication with the light emitting elements 21. When the light assembly 15 is removed or uncoupled from the pole element 12, the electrical communication between the electrical wiring 17 and the light emitting elements 21 may cease.

As shown in FIGS. 4 and 8, in some embodiments, the base 11 may comprise a pole aperture 25 which may be complimentary in shape to the pole element 12. The pole element 12 may be inserted into the pole aperture 25 and then coupled or removably coupled to the base 11. In other embodiments, the base 11 and pole element 12 may be integrally formed or coupled together.

Figure 6:
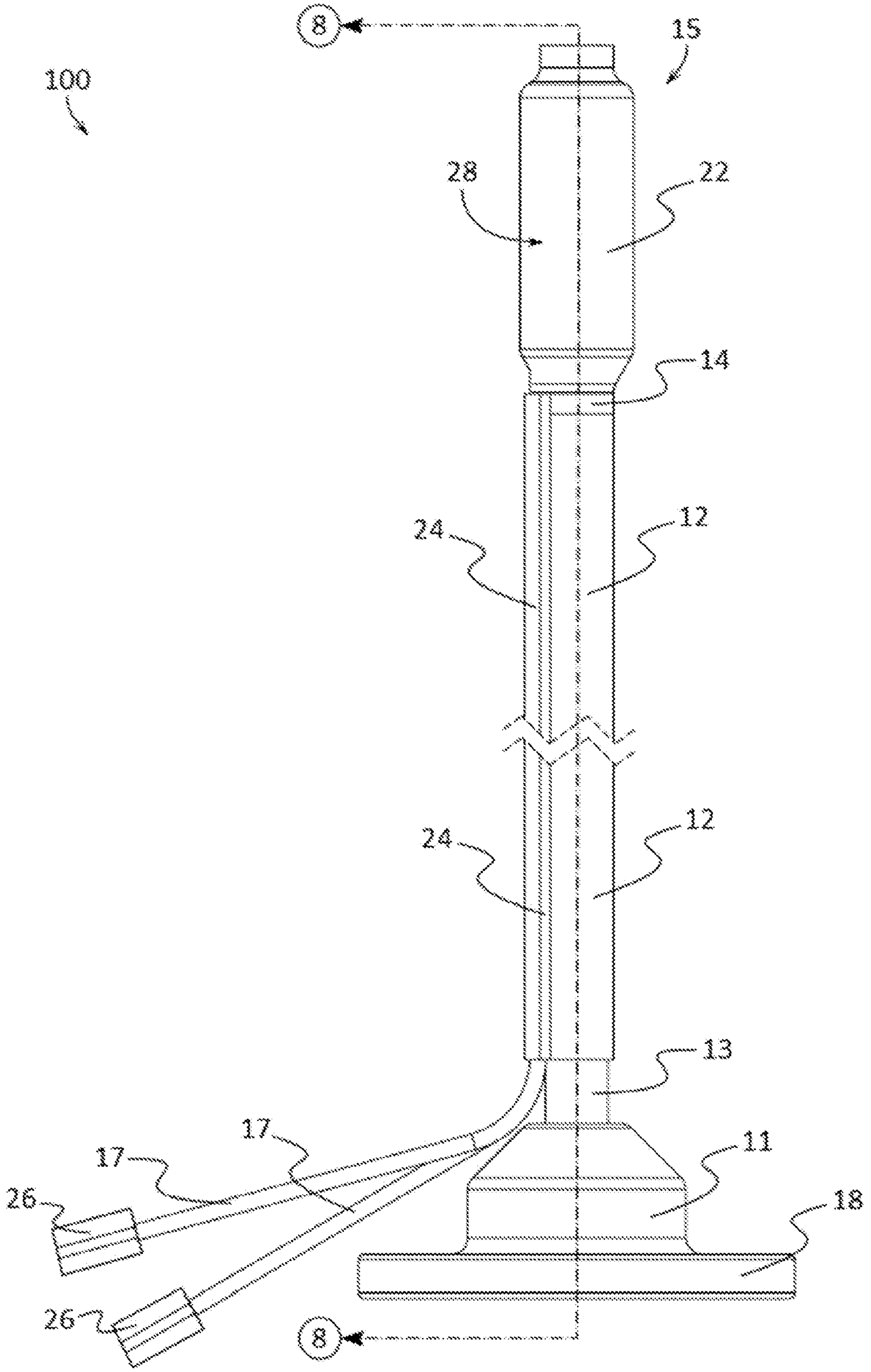
FIG. 6 shows an elevation view of an alternative example of a maritime navigation light apparatus according to various embodiments described herein.
Figure 7:
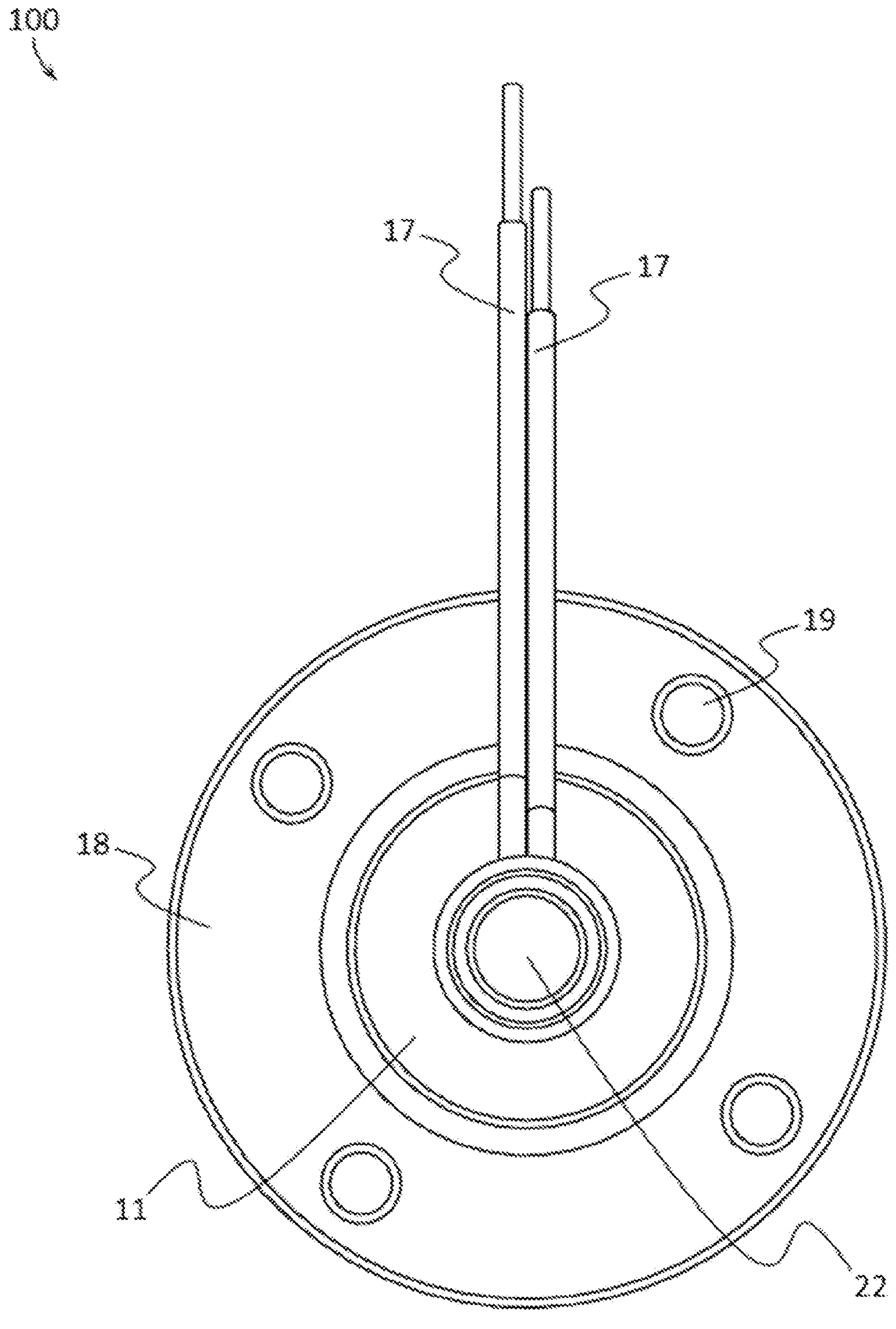
FIG. 7 depicts a plan view of the top of an alternative example of a maritime navigation light apparatus according to various embodiments described herein.

In some embodiments as shown in FIG. 6, the electrical wiring 17 may optional comprise electrical plug elements, such as micro connectors, which may be configured to facilitate attachment and detachment of the electrical wiring 17 from the power supply of the watercraft and/or to facilitate attachment and detachment of the circuit board 20 to the electrical wiring 17. In the embodiment depicted in FIG. 6, the electrical wiring 17 and the electrical plug elements 26 may terminate on the exterior of the apparatus 100. In other embodiments, the electrical wiring 17 and/or the electrical plug elements 26 may terminate in the interior of the apparatus 100 such as in the interior of the pole element 12 or the base 11. An electrical plug element 26 may comprise any type of electrical connector or plug and may preferably be waterproof.

Figure 9:
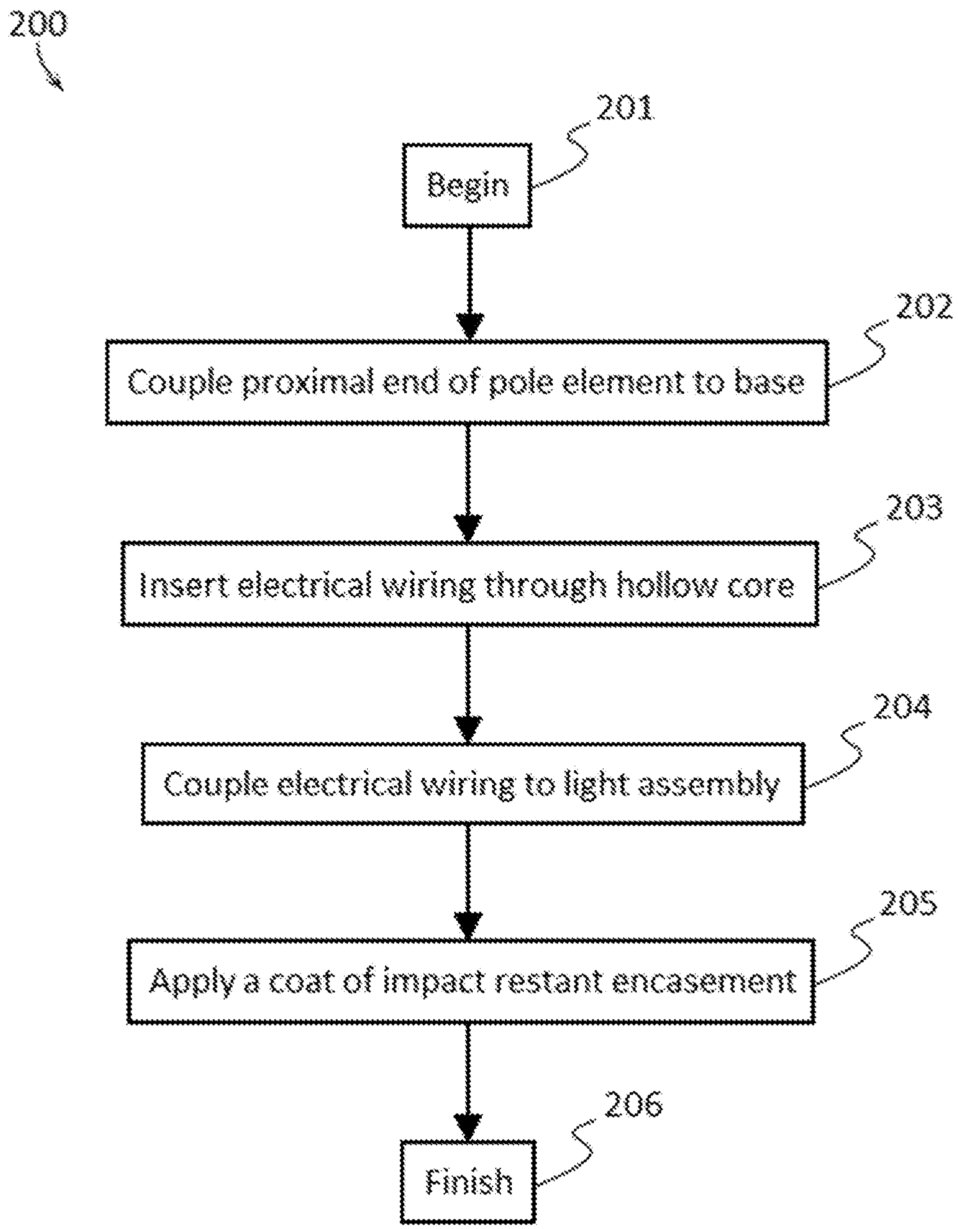
FIG. 9 depicts a flow diagram of an example method of manufacturing a maritime navigation light apparatus according to various embodiments described herein.

FIG. 9 depicts a flow diagram of an example method of manufacturing or making a maritime navigation light apparatus ("the method") 200 according to various embodiments described herein. In some embodiments the method of making a maritime navigation light apparatus 200 comprising: a base; a pole element coupled to the base, the pole element having a proximal end and a distal end and a hollow core extending from the distal end to the proximal end; and a light assembly positioned at the distal end of the pole element, the light assembly comprising a circuit board housing one or more light emitting elements and having an impact resistant encasement, wherein the method may comprise: coupling the proximal end of the pole element to the base; inserting electrical wiring through the hollow core of the pole element; coupling the electrical wiring to the circuit board; and applying a coat of impact resistant encasement over portions of the circuit board and the pole element, thereby coupling the light assembly to the distal end of the pole element.

In further embodiments, the method 200 may begin 201 by coupling the proximal end 13 (FIGS. 1-8) of the pole element 12 (FIGS. 1-8) to the base 11 (FIGS. 1-8) in step 202. In further embodiments, the base 11 may be coupled to the pole element 12 with heat bonding, chemical bonding, adhesives, fasteners, or any other suitable joining method. In alternative embodiments, the base 11 may be removably coupled to the pole element 12 by being press fit or snap fit together, by one or more fasteners, threading, a push-to-lock type connection method, a turn-to-lock type connection method, slide-to-lock type connection method or any other suitable temporary or removable connection method as one reasonably skilled in the art could envision to serve the same function.

Next, the electrical wiring 17 (FIGS. 1-8) may be inserted into and through hollow core 16 (FIG. 4) of the pole element 12 (FIGS. 1-8) in step 203. In alternative embodiments, electrical wiring 17 may be coupled to the exterior of the pole element 12 with pole shrink wrap 24 (FIG. 8) such as heat activated shrink wrap, adhesive, one or more fasteners, or any other suitable coupling method.

The electrical wiring 17 (FIGS. 1-8) may then be coupled to the light assembly 15 (FIGS. 1-8) comprising a circuit board 20 (FIG. 4) housing a plurality of light emitting elements 21 (FIG. 4) such as light emitting diodes in step 204. In some embodiments, the light assembly 15 may comprise a circuit board 20 which may be flexible and configured to bend or flex while housing a plurality of light emitting elements 21 while maintaining electrical communication between the light emitting elements 21 and the electrical wiring 17. In further embodiments, portions of a flexible circuit board 20 may be folded over and against portions of the pole element 12 such as the distal end 14 and optionally held in place with adhesive. The electrical wiring 17 may be coupled to the circuit board 20 with solder, electrical connectors, or any other suitable electrical connection method which may provide electrical communication between the electrical wiring 17 and the light assembly 15.

In step 205, a coat of impact resistant encasement 22 may be applied over portions of the circuit board 20 and the pole element 12, thereby coupling the light assembly 15 (FIGS. 1-8) to the distal end 14 (FIGS. 1-8) of the pole element 12 (FIGS. 1-8). The impact resistant encasement 22 may be formed onto the exterior of the light assembly 15 by coating the circuit board 20 and a portion of the distal end 14 of the pole element 12 with the impact resistant encasement 22. In some embodiments, a coat of impact resistant encasement 22 comprising tubular shaped heat activated shrink wrap which may be placed over the circuit board 20 and a portion of the pole element 12, such as the distal end 14, and then activated to form an impact resistant encasement 22 on the light assembly 15 and on the distal end 14 of the pole element 12. Optionally, an adhesive such as epoxy or other water impermeable material may be applied to or over portions of the distal end 14 of the pole element 12 and the circuit board 20 to seal the impact resistant encasement 22 to form a laminated structure 23 (FIGS. 4 and 8), sealed structure, laminated structure, and the like. Once the impact resistant encasement 22 is sealed over the distal end 14 of the pole element 12 and the circuit board 20, the method 200 may finish.

In other embodiments, a coat of impact resistant encasement 22 comprising vinyl, plastisol, nylon, polyolefin, polyethylene, or any other suitable material may be applied over the circuit board 20 and a portion of the pole element 12, such as the distal end 14, by dip molding. For example, the circuit board 20 and a portion of the pole element 12 may be heated and then dipped into liquid plastisol. During dipping, heat in the circuit board 20 and the pole element 12 transfers to the plastisol and gels the surrounding material. The hotter the circuit board 20 and the pole element 12 and the longer the dip, the thicker the gelled coating. Once the circuit board 20 and the pole element 12 are removed from the liquid plastisol, the gelled plastisol on the circuit board 20 and the pole element 12 may be post heated (or "cured") and the plastisol fuses.

In still other embodiments, a liquid coat of impact resistant encasement 22 comprising Bisphenol A epoxy resin, Bisphenol F epoxy resin, Novolac epoxy resin, Aliphatic epoxy resin, Glycidylamine epoxy resin, epoxy powder coatings, or any other suitable epoxy material may be applied over the circuit board 20 and a portion of the pole element 12, such as the distal end 14 and then cured to form a solid impact resistant encasement 22. For example, the circuit board 20 and a portion of the pole element 12 may be dipped, bushed, flow coated, roll coated, knife coated, or spayed with liquid epoxy. The applied epoxy coating may then be cured over the circuit board 20 and portions of the pole element 12 forming of impact resistant encasement 22.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A maritime navigation light apparatus, the apparatus comprising;

a base;

a pole element coupled to the base, the pole element having a proximal end coupled to the base and a distal end, the distal end terminating at a distal tip;

a flexible circuit board wrapped around the distal end of the pole element, the flexible circuit board housing a plurality of light emitting elements radiating outwardly away from the pole element below the distal tip so that the light emitting elements generate light below the distal tip of the pole element; and a transparent impact resistant encasement formed over the exterior of both the flexible circuit board and a portion of the distal end of the pole element, the transparent impact resistant encasement in direct surface contact with the portion of the distal end of the pole element therefore providing impact protection for both the distal end of the pole element as well as the flexible circuit board.

2. The apparatus of claim 1, wherein the pole element comprises a hollow core configured to accept electrical wiring.

3. The apparatus of claim 1, wherein the light assembly is integrally formed with the pole element.

4. The apparatus of claim 1, wherein the light assembly is removably coupled to the pole element.

5. The apparatus of claim 1, wherein the pole element is constructed from a rigid material selected from one of metal alloys, ceramics, carbon fiber, hard plastics, fiber reinforced plastics, fiberglass, and hard resins.

6. The apparatus of claim 1, wherein the impact resistant encasement of the light assembly is selected from one of polyvinyl chloride, vinyl, polyolefin, polyethylene, silicone, and epoxy.

7. The apparatus of claim 1, wherein the circuit board is a flexible circuit board configured to bend around the distal end of the pole element.

8. A method of making a maritime navigation light apparatus, the apparatus comprising:

a base;

a pole element coupled to the base, the pole element having a proximal end and a distal end and a hollow core extending from the distal end to the proximal end, the distal end terminating at a distal tip; and a light assembly positioned at the distal end of the pole element, the light assembly comprising a circuit board housing one or more light emitting elements and having a transparent impact resistant encasement, the method comprising:

a. coupling the proximal end of the pole element to the base;

b. inserting electrical wiring through the hollow core of the pole element;

c. coupling the electrical wiring to the circuit board;

d. folding the flexible circuit board so that the flexible circuit board wraps around a portion of the distal end of the pole element; and e. applying a coat of the transparent impact resistant encasement over portions of both the circuit board and the pole element so that transparent impact resistant encasement is in direct surface contact with the pole element, thereby coupling the light assembly to the distal end of the pole element.

9. The method of claim 8, wherein a coat of impact resistant encasement comprising tubular shaped heat activated shrink wrap is placed over the circuit board and the distal end of the pole element and then activated to form an impact resistant encasement on the light assembly and on the distal end of the pole element.

10. The method of claim 8, wherein a coat of impact resistant encasement is applied over the circuit board and a portion of the pole element by dip molding.

11. The method of claim 10, wherein the coat of impact resistant encasement is selected from one of vinyl, plastisol, nylon, polyolefin, and polyethylene is applied over the circuit board and a portion of the distal end of the pole element by dip molding.

12. The method of claim 8, wherein a liquid coat of impact resistant encasement is applied over the circuit board and a portion of the pole element and then cured to form a solid impact resistant encasement.

13. The method of claim 12, wherein the liquid coat of impact resistant encasement is selected from one of Bisphenol A epoxy resin, Bisphenol F epoxy resin, Novolac epoxy resin, Aliphatic epoxy resin, Glycidylamine epoxy resin, and epoxy powder coatings is applied over the circuit board and a portion of the distal end of the pole element and then cured to form a solid impact resistant encasement.

14. The Method of claim 8, wherein a portion of the flexible circuit board is positioned below the distal tip of the of the pole element.

15. The method of claim 8, wherein the flexible circuit board is positioned below the distal tip of the of the pole element and a lighting element is positioned on the circuit board below the distal tip of the pole element and is configured to illuminate the distal end of the pole element below the distal tip of the pole element.

* * * * *